United States Patent
Regan et al.

(10) Patent No.: US 7,558,194 B2
(45) Date of Patent: Jul. 7, 2009

(54) VIRTUAL PRIVATE NETWORK FAULT TOLERANCE

(75) Inventors: Joe Regan, Pleasanton, CA (US); Vach Kompella, Cupertino, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 697 days.

(21) Appl. No.: 10/833,578

(22) Filed: Apr. 27, 2004

(65) Prior Publication Data

US 2004/0233891 A1    Nov. 25, 2004

Related U.S. Application Data

(60) Provisional application No. 60/466,269, filed on Apr. 28, 2003.

(51) Int. Cl.
*G01R 31/08* (2006.01)

(52) U.S. Cl. .................................. 370/217; 370/221

(58) Field of Classification Search ............... 370/227
See application file for complete search history.

(56) References Cited

U.S. PATENT DOCUMENTS

| | | | |
|---|---|---|---|
| 6,831,918 B1 * | 12/2004 | Kavak ................. 370/395.52 |
| 6,999,459 B1 * | 2/2006 | Callon et al. ............... 370/400 |
| 7,065,040 B2 * | 6/2006 | Nagamine .................. 370/223 |
| 7,283,465 B2 * | 10/2007 | Zelig et al. .................. 370/219 |
| 7,339,929 B2 * | 3/2008 | Zelig et al. .................. 370/390 |
| 2001/0036153 A1 * | 11/2001 | Sasaki et al. ............... 370/218 |
| 2002/0112072 A1 * | 8/2002 | Jain ........................ 709/239 |
| 2003/0016624 A1 * | 1/2003 | Bare ........................ 370/217 |
| 2003/0039212 A1 * | 2/2003 | Lloyd et al. ................ 370/235 |
| 2003/0058790 A1 * | 3/2003 | Nagamine .................. 370/222 |
| 2003/0123446 A1 * | 7/2003 | Muirhead et al. ............ 370/392 |
| 2003/0174706 A1 * | 9/2003 | Shankar et al. ............. 370/393 |
| 2003/0179701 A1 * | 9/2003 | Saleh et al. ................ 370/216 |
| 2004/0004937 A1 * | 1/2004 | Skalecki et al. ............. 370/227 |
| 2004/0032856 A1 * | 2/2004 | Sandstrom .................. 370/351 |

\* cited by examiner

*Primary Examiner*—Wing F Chan
*Assistant Examiner*—Eunsook Choi

(57) ABSTRACT

Loss of connectivity on a mesh or virtual service (e.g., VPLS) may be restored by "stitching" a healing path between an affected node and another node on the mesh. Connectivity may be restored by "healing" or constructing an alternate path or connection between the affected node and the mesh. Unidirectional and bidirectional healing may be used to establish an alternate path between the affected node and the mesh. Additionally, removing pseudowire connections between the affected node and the mesh may be performed, while establishing a spoke connection to an advertised, available router to create a new connection or "stitch" together existing connections.

21 Claims, 9 Drawing Sheets

VIRTUAL PRIVATE NETWORK FAULT TOLERANCE

CROSS REFERENCE TO RELATED APPLICATIONS

This application claims priority to U.S. Provisional Patent Application No. 60/466,269 entitled "Fault Tolerance in a Virtual Private Network Implemented on a Fully Connected Mesh Network" filed Apr. 28, 2003, which is incorporated herein by reference for all purposes.

FIELD OF THE INVENTION

The present invention relates generally to computer networks. More specifically, virtual private network fault tolerance is disclosed.

BACKGROUND OF THE INVENTION

When a virtual private LAN service (VPLS) is established, provider edge (PE) routers participating in the service are connected to each other in a full mesh of pseudowires. A mesh may include one or more networks, where connections may be established using pseudowires. A pseudowire may be a virtual circuit that simulates a circuit or wire connecting two nodes. In a typical LAN, packets are sent to a particular PE that is known to have a MAC address associated with it. Thus, when a packet is received on a pseudowire of the mesh (e.g., VPLS), the packet is not forwarded back onto the mesh to another PE, as the MAC address is typically associated with the receiving PE. The packets are forwarded to their intended destinations over spoke connections to customer and/or provider equipment connected to the mesh. However, when a break or loss of connectivity occurs between a PE and the mesh, re-establishing connectivity may be difficult. Connectivity may be lost when, for example, a label switched path (LSP) of the mesh is broken or lost due to a connectivity failure or provisioning change. There may be substantial inefficiencies, time delays, and undesired complexity when attempting to correct the loss. Inefficiencies and problems may occur in management, signaling, and operation over a VPLS when attempting to resolve a loss of connectivity.

In order to establish/re-establish connectivity to replace damaged or lost connections, signaling pathways (e.g., Layer 2 tunnels) are used. However, where a connection is completely lost, there is no mechanism to signal an alternate path. Further, in multi-nodal meshes or VPLS configurations, there may be significant difficulty in establishing and signaling an alternate path to the affected router. Duplicate packets, increased latency, and reduced network efficiency may result when attempting to restore connectivity to a full mesh of connections. The loss of a pseudowire on the mesh also creates problems when attempting to restore connectivity to the mesh.

Thus, what is needed is a solution for restoring connectivity to a mesh of nodes where a connection is fully or partially lost to one or more nodes. Further, there is a need for a solution where alternate connections may be established in an efficient configuration.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A network service such as a VPLS may include one or more provider edge routers combined in a mesh using pseudowires that provide connectivity for data communications. When packets are received at a provider edge router via a mesh connection, they are not forwarded back onto the same mesh. It is not necessary to do so, even in the case of an unknown MAC address, since each provider edge (PE) device is connected to the other PEs associated with the VPLS. However, when a break occurs, it becomes necessary to heal the broken mesh connection or, failing that, to modify the configuration of one or more of the affected PEs to ensure full connectivity. Techniques for restoring full mesh connectivity are disclosed. In one approach, loss of connectivity on a mesh or virtual service (e.g., VPLS) may be restored by "stitching" an alternate path between an affected node (e.g., PE) and another node on a mesh.

Figure 1A:
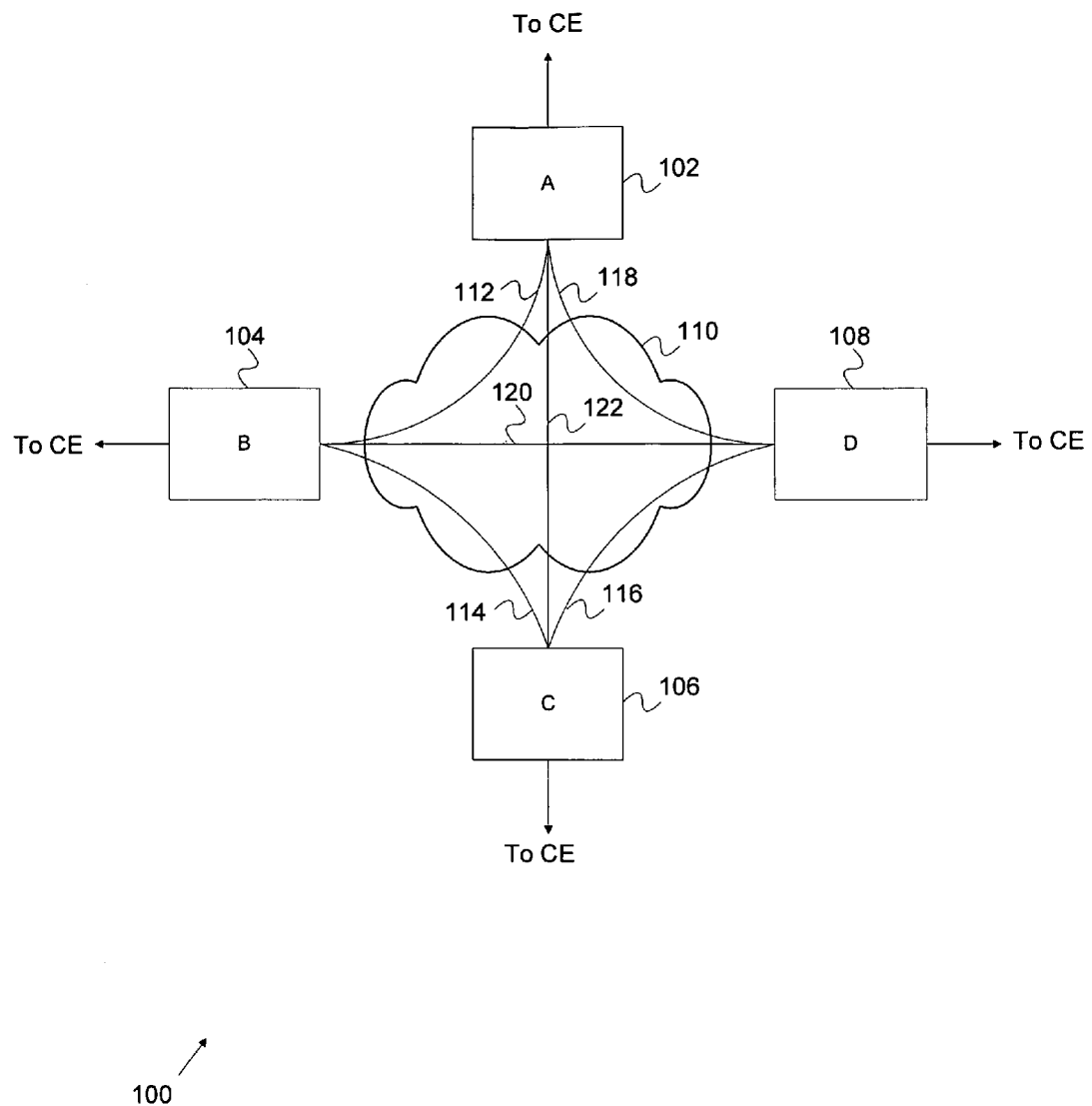
FIG. 1A illustrates a multi-node mesh, in accordance with an embodiment.

FIG. 1A illustrates a multi-nodal mesh, in accordance with an embodiment. In this example, a VPLS 100 includes 4 nodes connected in a full mesh. The nodes are implemented as PE routers 102-108. Each PE router 102-108 is connected to each other node over network 110. Each PE router 102-108 can also forward packets to one or more customer edge (CE) routers, as indicated.

Paths 112-122 establish a "mesh" of connections on VPLS 100. Paths 112-122 may be implemented as a series of connections, tunnels (e.g., Layer 2 tunnels for routing frames between PEs), or "pseudowires." Pseudowires refer to Layer 2 virtual tunnels that exist between PE routers that use MPLS encapsulation. Pseudowires may be referred to as dynamic or configurable in a dynamic fashion in order to restore connectivity in an ad hoc manner. Pseudowires may also be described as "virtual circuits" used to transport, in a point-to-point fashion, Layer 2 frames (e.g., frame relay, Ethernet, etc.) Signals are sent to denote the type of pseudowire/connection and services that are available to help nodes realize how to handle/transport/forward/interpret data. The mesh enables data frames to be forwarded between PE routers 102-108 using any of paths 112-122.

In this example, paths 112-122 may be implemented as layer 2 tunnels, which enable both data communication, management, and other tasks such as signaling paths to specific destinations (e.g., PE). As used herein, the term "data frames" may refer to data encapsulated under any suitable protocol and may be used, without limitation, for Ethernet, frame relay, or other types of layered protocol data traffic. Although several examples of layer 2 data traffic signaling, routing, and forwarding are described, other embodiments of the techniques disclosed herein may be used at other layers.

A VPLS such as VPLS 100 typically employs a so-called "split horizon" forwarding regime, in which frames received at a PE via mesh connection are not flooded or otherwise forwarded back onto the mesh, but frames to an unknown MAC address may be replicated along all "spoke" connections on the customer-facing side. In other words, if node 102 receives a frame from the VPLS 100 mesh, it will not forward the frame back onto the mesh. The split horizon property can result in a loss of continuity between customer endpoints even in cases in which connectivity between those points still exists, as explained more fully below.

Figure 1B:
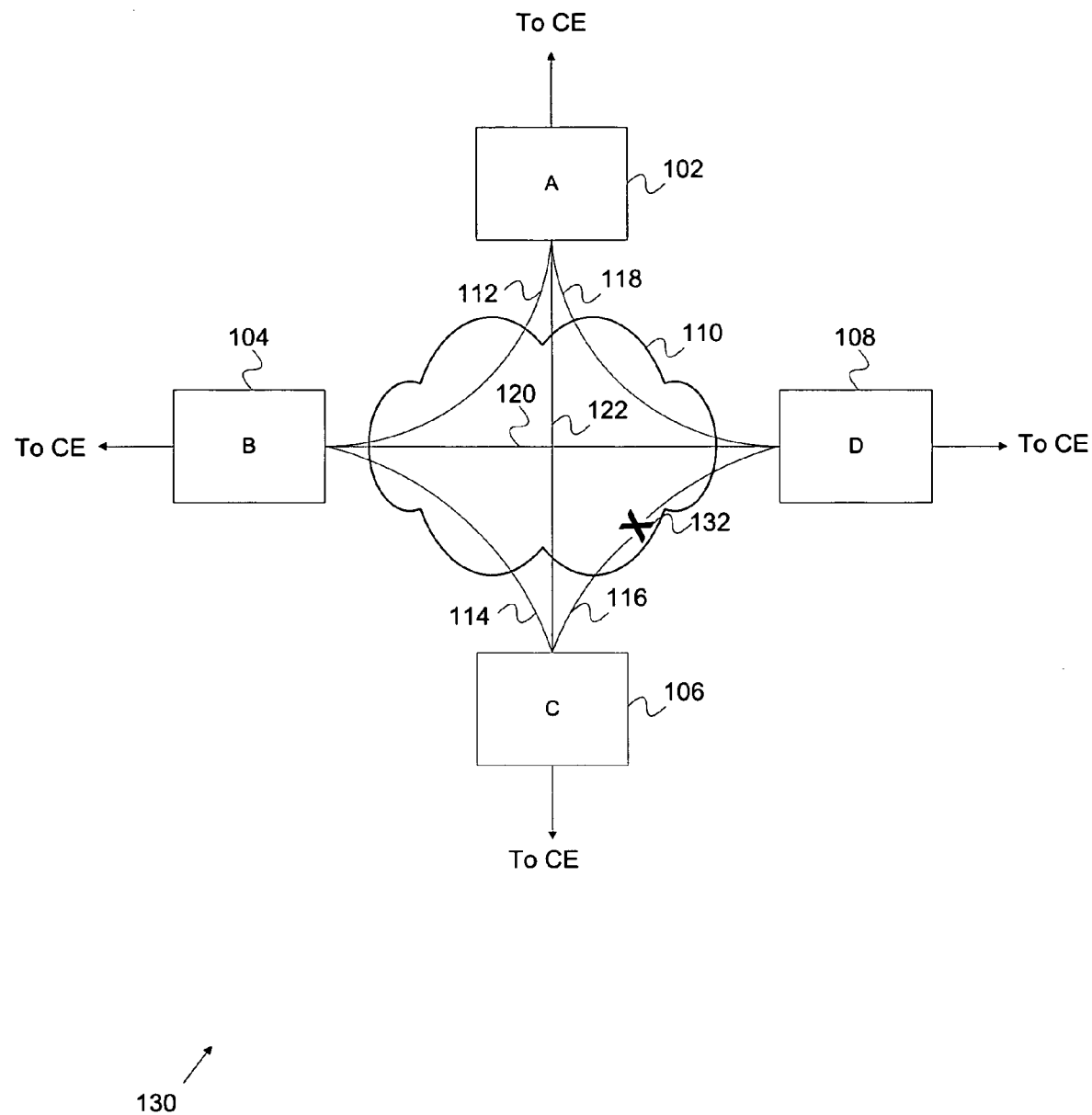
FIG. 1B illustrates a multi-mode mesh with a loss of connectivity, in accordance with an embodiment.

FIG. 1B illustrates a multi-mode mesh with a loss of connectivity, in accordance with an embodiment. Here, mesh 130 (similar to that described in FIG. 1A) has a break in connection 116 between nodes 106 (C) and 108 (D), as represented by the "X" labeled 132. In this example, break 132 in path 116 prevents any data traffic from getting to node 108 from node 106. Thus, data frames may be prevented from being sent from node 106 to node 108, or vice versa, which requires an alternate connection. The break 132 could be caused by any number of events or circumstances, including without limitation the loss of the underlying label switched path (LSP) used to provide the pseudowire mesh connection or the misprovisioning of one or more nodes intended to be included in the mesh. Consider, for example, the effect of a break such as break 132 on the mesh 130. Suppose the PE 106 has learned to associate a MAC address with the PE 108, e.g., because the MAC address is associated with a CE device connected to PE 108 via a spoke connection. Prior to the break 132 occurring, PE 106 would forward frames addressed to the MAC address to PE 108, via mesh connection 116, for delivery to the associated customer equipment. Once the break 132 occurs, however, PE 106 unlearns the association of the MAC address with PE 108. The next time a frame destined for the MAC address it formerly associated with PE 108 is received at PE 106 via a customer-facing interface (i.e., not from the mesh), PE 106 will treat it as an unknown MAC address and as such will "flood" the frame onto the nodes of the mesh with which it still has mesh connectivity (i.e., nodes A and B in this example). Upon receiving the frame from the mesh, neither node A or B would be able to further forward the frame to node D (108), even if the former nodes new the MAC address was associated with node D, due to the split horizon property described above. Therefore, even though connectivity theoretically exists between customer nodes associated with node C (106) and those associated with node D (108), e.g., through nodes A and B, frames cannot be delivered between the two nodes due to the presence of the break 132 and the split horizon property of the mesh 130.

As described above, when a mesh is established the nodes that belong to the mesh are defined as members of the mesh. When a membership is initially constituted, a process known as provisioning is used. By provisioning the members of the mesh, the members of the mesh are identified to each node so that each router (e.g., PE) knows where to forward packets when received. Membership may be described as lists that are assigned to each node on a mesh to inform the node what other nodes should be members of the mesh (sometimes referred to herein as the "provisioned" list) and to allow each node to keep track of the status of the mesh connections that it and/or other member nodes have established (sometimes referred to herein as "operational" lists). Members of the mesh may be configured to inform other members of the status of the operational list, e.g., while the mesh is being established, such as by attaching associated data as an additional or prescribed type-length-value (TLV) field of a provisioning, administrative, or other message.

If a node is misprovisioned or misconfigured so that membership is improperly identified, the node may not be configured to forward frames properly. For example, if a node is misprovisioned such that it mistaken believes it should establish a mesh connection with another node when in fact the connection should be a spoke connection, the node may either not be able to establish a connection or may establish the wrong type of connection with the other node. Data obviously could not be forwarded between the two nodes if no connection were established as a result of misprovisioning, and if the wrong type of connection were established data may not be forwarded properly due to the split horizon property described above. Loss of (or failure to establish) continuity may also result from problems such as a break in or other loss or unavailability of the underlying LSP used (or intended to be used) to provide a pseudowire mesh connection, as described above.

Several solutions for restoring continuity (e.g., membership, mesh-to-spoke, spoke-to-mesh, bidirectional stitching, unidirectional stitching ("healing")) are discussed below in connection with FIGS. 2-7. Alternate paths and nodes may be identified and, once selected, (i.e., node 108) signaled to provide "stitched healing" for restoring connectivity to an affected node. "Stitched healing" may also be referred to as "healing" and algorithms may be used to determine the node or pseudowires that should be stitched or connected in order to reconfigure a mesh to restore connectivity (i.e., loss of pseudowire, mistaken membership, improper or incomplete provisioning, etc.) where a loss has occurred. These techniques are described in greater detail below in connection with FIGS. 2 through 7.

Figure 2:
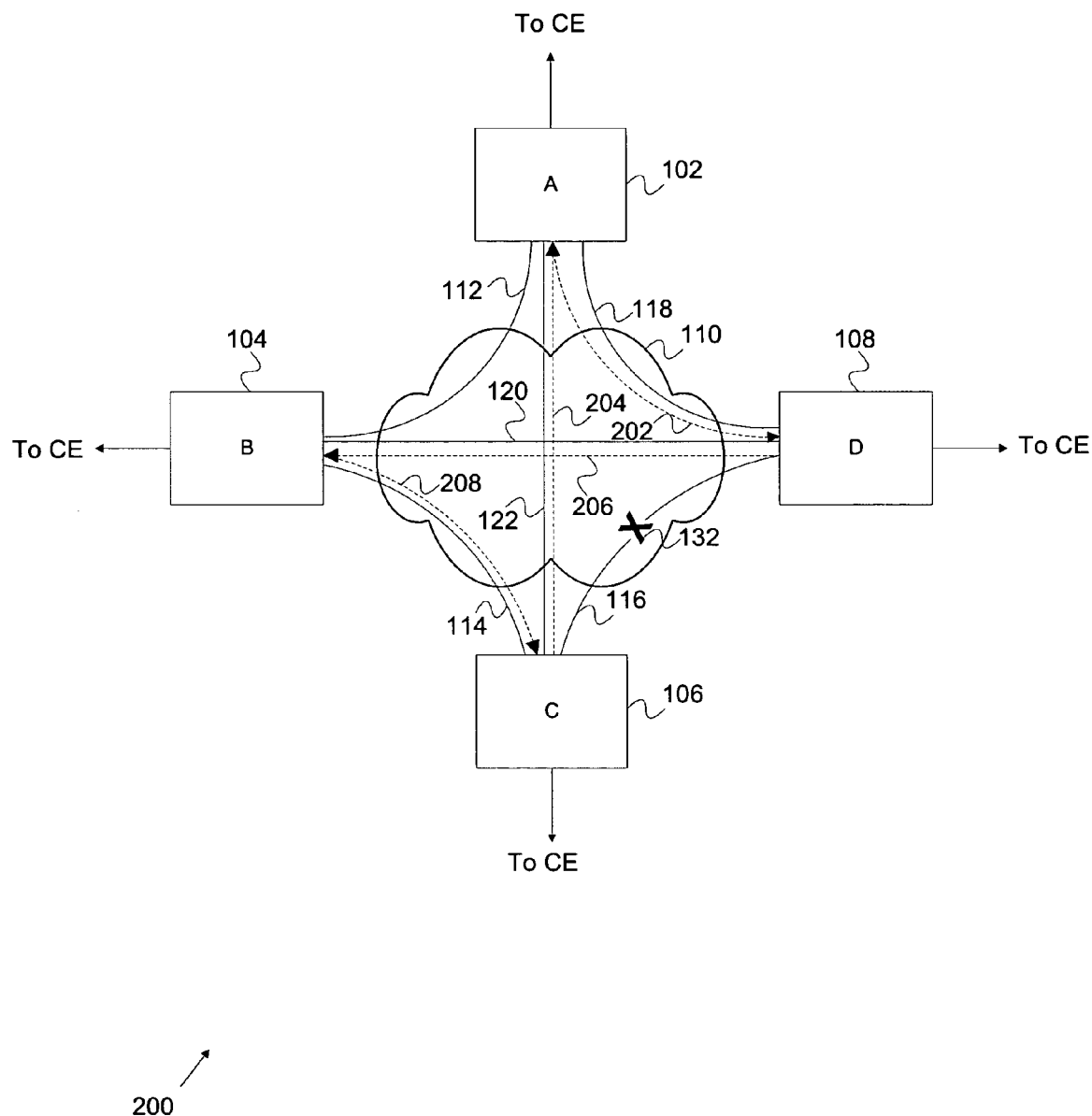
FIG. 2 illustrates unidirectional healing, in accordance with an embodiment.

FIG. 2 illustrates unidirectional stitching, in accordance with an embodiment. In this example, unidirectional stitching is an example of healing a damaged mesh, where one or more nodes may lose connectivity over one or more connections with mesh 200. The approach is described as "unidirectional" because continuity is established (or re-established) by routing traffic from a first affected node to a second affected node via a first unidirectional stitched path and routing traffic from the second affected node to the first affected node via a separate and potentially different unidirectional stitched path. Such an approach may be desirable, e.g., in a case in which continuity is lost due to the loss or other unavailability of an underlying LSP between the affected nodes, but it may be useful in other circumstances as well. In the example shown in FIG. 2, the affected nodes 106 (C) and 108 (D) have experienced a loss in connectivity to the mesh due to break 132. Break 132 may cause a full or partial loss of connectivity, thus requiring an alternate path or healing solution in order to restore full connectivity within the VPLS or mesh 200. Pseudowires 114, 118, 120 and 122, as described in FIGS. 1A-1B are still present from the original mesh and are used to provide mesh connectivity between the nodes connected by those pseudowires. However, lost connectivity between affected nodes 106 and 108 may be restored by establishing unidirectional stitched paths, as described below. In one embodiment, each affected node (i.e., 106 and 108) may signal a unidirectional alternate path to be used by the other affected node to send frames to it. For example, node 108 can signal an alternate path via node 102 for node 106 to use to send frames to node 108, as indicated by the dotted lines with the single-directional arrows 202 and 204. Separately, node 106 may signal an alternate path to be used by node 108 to send frames to node 106, using node 104 as an intermediary. This alternate path is indicated in FIG. 2 by the single-directional arrows with the dotted lines 206 and 208. Alternate paths may be established in one embodiment, for example, by configuring nodes 106 and 108 to propagate special virtual circuit identifiers (VC IDs), types, and/or labels to establish the unidirectional stitched paths represented by arrows 202 and 204 (for frames to be sent from node 106 to node 108 via node 102) and arrows 206 and 208 (for frames to be sent from node 108 to node 106 via node 104), respectively. Various approaches and algorithms may be used to determine which alternate path will be established (i.e., to select the node that will act as the intermediary or proxy). As an example, node 104 may advertise to nodes 102 and 108 that it can send/forward traffic to node 106, and may advertise to nodes 102 and 106 that it can send/forward traffic to node 108, despite the broken connection between nodes 106 and 108. Node 104 might be configured to do so, for example, upon receiving an indication from either node 106 or node 108, or from some other monitoring node, that node 106 and node 108 have lost the mesh connection between them. Likewise, node 102 may advertise that it can send/forward traffic to node 106 and/or node 108. In this example, the alternate paths are signaled by the affected node to the other nodes on the mesh, thus establishing alternate paths for the other affected node(s) to use in order reach it. In one embodiment, management protocol(s) may be used to establish rules and logic for governing mesh 200 and how various functions and activities are conducted, including provisioning, signaling, choice of alternate path, etc. In some embodiments, unidirectional healing, as shown in this example, may be used to enable an affected node (e.g., node 108) to self-restore connectivity without the use of an additional centralized node to provide supplementary logic enabling alternate paths to be signaled to the remaining nodes on the mesh. This is accomplished in one embodiment by configuring node 108 to send a special virtual circuit label and type identifier to node 102, e.g., comprising information needed by node 102 to understand that the connection will be of a special type (e.g., unidirectional, unlike the other pseudowire connections, which are bidirectional) and that the virtual circuit identifier (or some like identifier chosen by node 102) should be sent to node 106 to establish the unidirectional path by which node 106 will send to node 102 frames destined for node 108 (i.e., the path 204 shown in FIG. 2). Regardless of the number of affected nodes, unidirectional healing may be used to restore connectivity to affected nodes without requiring additional resources (e.g., additional centralized nodes, management protocols, etc.). Logic embodied in the individual PE's and/or in a centralized location may be used in some embodiments to optimize the choice of alternate path, e.g., based on capacity, load, utilization, availability, proximity, and/or other or different factors. Alternatively, the affected nodes themselves may be configured to select the alternate path on some basis, e.g., based on information reported or advertised to the affected node by other nodes and/or on some other basis.

Figure 3:
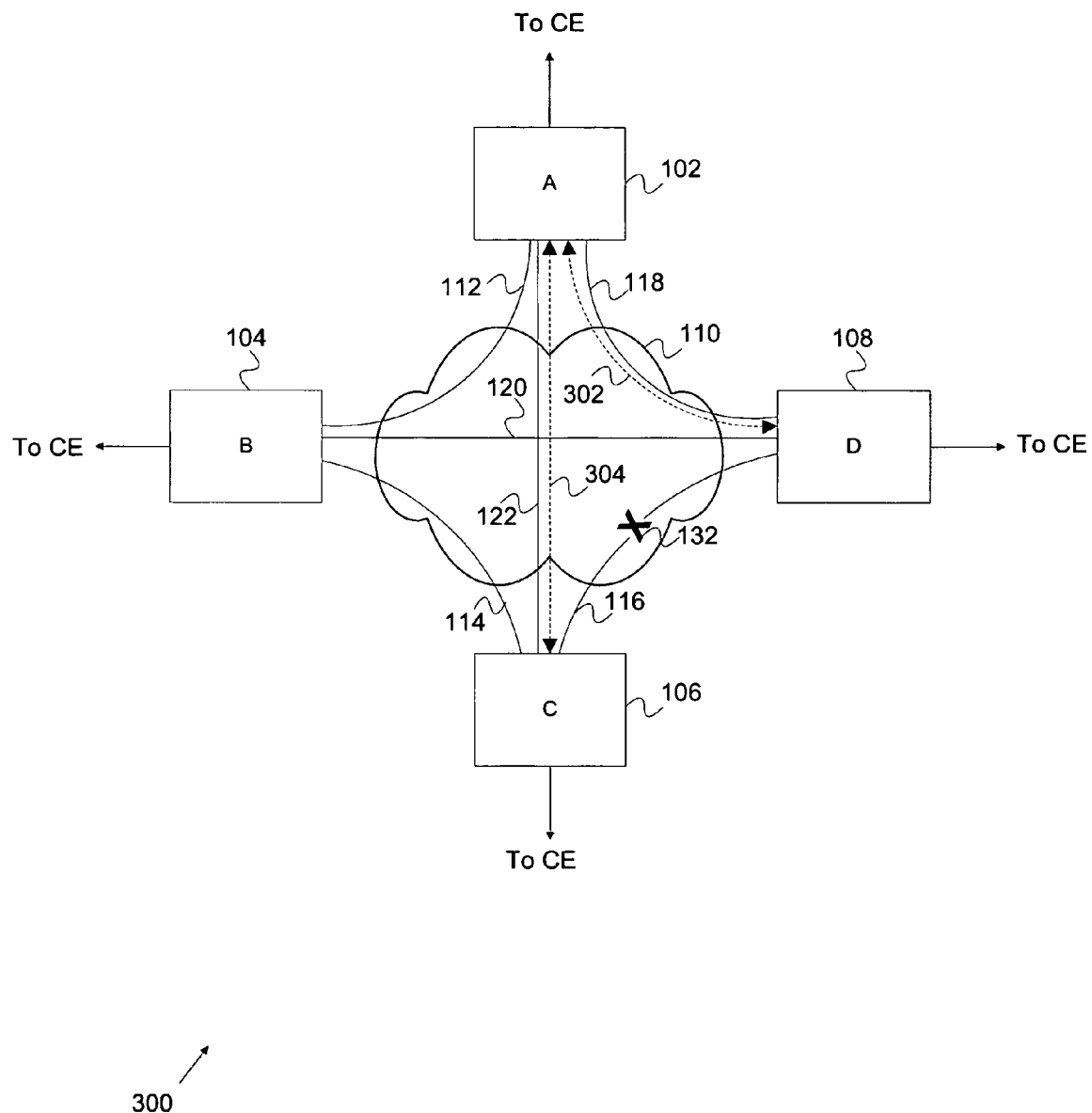
FIG. 3 illustrates bidirectional healing, in accordance with an embodiment.

FIG. 3 illustrates bidirectional healing, in accordance with an embodiment. As illustrated in FIG. 2, pseudowires 114-122 are also present, representing connections that are part of the original mesh. Break 132 has occurred in pseudowire 116 and re-establishing connectivity between node 108 and node 106 is desired. In the example shown, bi-directional pseudowires 302 and 304 may be used to stitch together a connection between nodes 106 and 108. Here, central logic may be used to arbitrate and determine which nodes may be used to establish an alternate path for data to affected nodes. The central logic may be implemented using a management protocol (e.g., MPBGP, Targeted LTP, etc.) for arbitrating and determining alternate paths to an affected node by, for example, signaling alternate L2 tunnels by exchanging VC IDs/types/labels, etc. Protocols such as MPBGP (BGP4+ with multiprotocol extensions) and targeted LTP may be used as a basis for implementing rules that allow nodes 102-108 to determine alternate paths between affected nodes, in this case, nodes 106 and 108.

In this example, break 132 occurs in path 116, causing the mesh connection between nodes 106 and 108 to be lost. The loss of connectivity may be full or partial and bidirectional healing may be implemented to restore connectivity between nodes 106 and 108 within mesh 300. Here, an alternate path between node 106 and node 108 may be determined by arbitrating with other nodes. Arbitration with other nodes may include exchanging VC IDs, types, or labels by which one or the other of the affected nodes 106 and 108 proposes an alternate bidirectional path between the affected nodes. If the proposed path is selected as an alternate path for sending/receiving data between the affected nodes, then arbitration is completed by informing all nodes on mesh 300 as to the alternate path. One or more of the affected and/or other nodes may be configured with logic to effect the described arbitration, or an administrative/maintenance node may be configured to choose the alternate path based on information received from the various nodes and/or other sources. In the example shown in FIG. 3, node 102 has been selected as the proxy for communication between nodes 106 and 108 via bidirectional paths 302 and 304. Unaffected pairs of nodes continue to communicate via their normal mesh connections, as shown in FIG. 3. The original mesh can be fully restored once the mesh connection 116 has been restored simply by terminating the alternate paths 302 and 304.

Figure 4:
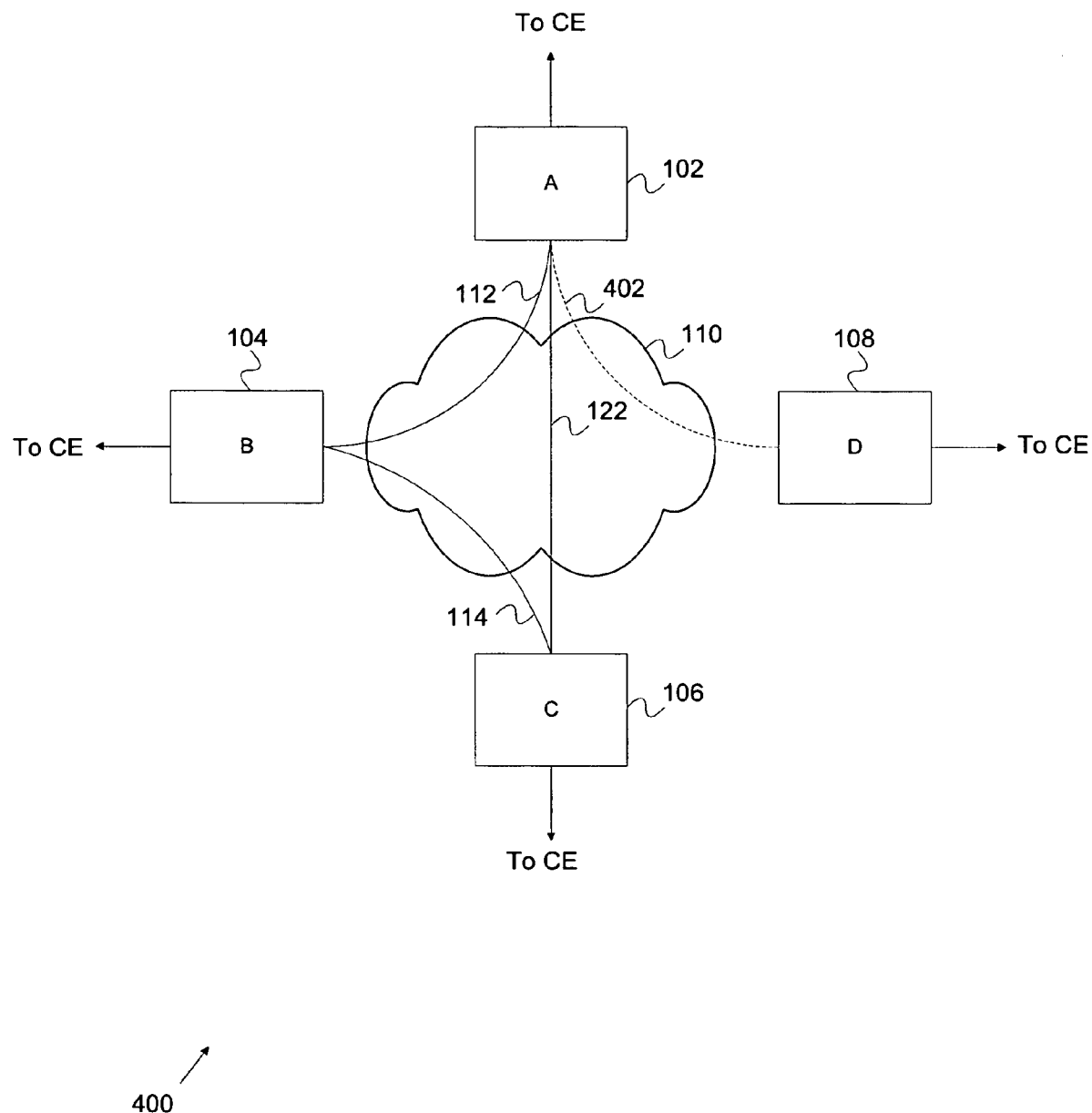
FIG. 4 illustrates mesh-to-spoke healing, in accordance with an embodiment.

FIG. 4 illustrates mesh-to-spoke healing, in accordance with an embodiment. In this example, affected node 108 is again affected by a loss of connectivity with affected node 106. The loss of connectivity may be full or partial. Here, connectivity is reconfigured from a mesh 130 to mesh-and-spoke configuration 400.

In the mesh-to-spoke approach, one or the other of the affected nodes must be selected to be removed, at least temporarily, from the mesh. In one embodiment, a node is selected to be removed or excluded from the mesh if conditions (e.g., provisioning data at other nodes) indicate the node was not meant to be a member of the mesh in the first place (e.g., it may have been misconfigured to believe it was meant to be part of the mesh). In the example shown, affected node 108 has been selected to be removed from the mesh by having its mesh connection to node 102 converted to a spoke connection 402 and having its remaining mesh connections dropped. Spoke 402 may be implemented as a layer 2 tunnel with node 102 that has been specifically identified for routing data to/from the mesh including nodes 102-106. Since the connection 402 has been converted in the example shown to a spoke connection, node 102 is able to forward to node 108 data frames received at node 102 from the mesh, without violating the split horizon property described above, thereby restoring full connectivity to node 108 and customer destinations (e.g., MAC addresses) associated with it. In one embodiment, node 102 informs nodes 104-106 of its role in providing a spoke connection to node 108. Data received at node 102 from mesh 400 is forwarded to affected node 108 via spoke 402. Nodes 104-106 have addresses in memory, signaled over a Layer 2 path, that identify an alternate path through node 102.

Figure 5:
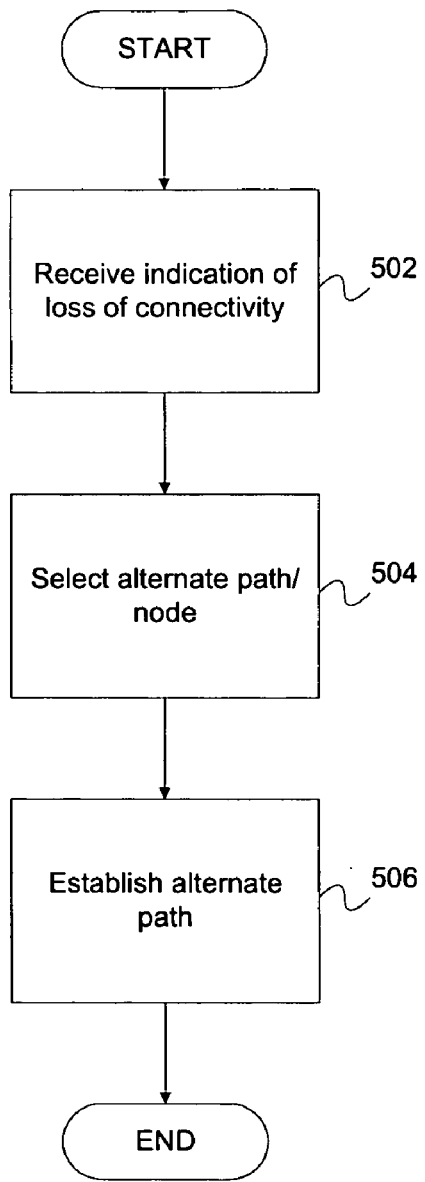
FIG. 5 illustrates a process for unidirectional healing, in accordance with an embodiment.

FIG. 5 illustrates a process for unidirectional healing, in accordance with an embodiment. In this example, this process may be used to implement unidirectional healing, as shown in FIG. 2. Here, an indication is received at a node or mesh indicating a loss of connectivity (502). The loss of connectivity may have occurred due to a full or partial loss of a connection or pseudowire with one or more nodes. The indication alerts other nodes on the mesh that, depending upon a management protocol in use, an alternate path should be selected (504). In one embodiment, an affected node selects another node to establish an alternate route to it. Once the alternate path has been selected, VC IDs, types, or labels may be used to signal the stitched path (i.e., alternate path) to other nodes on the mesh so as to inform them of the alternate path (506).

Figure 6A:
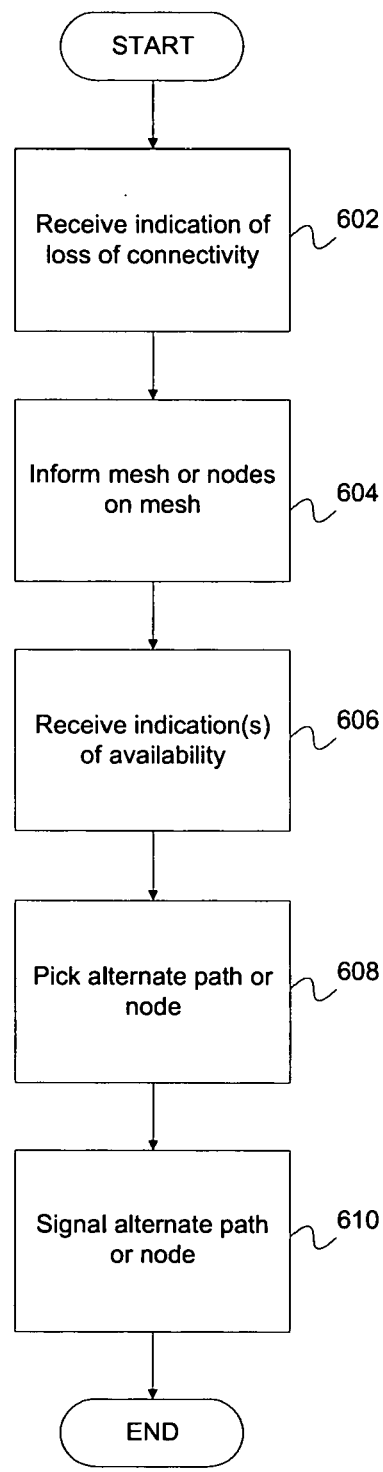
FIG. 6A illustrates a process for bidirectional healing, in accordance with an embodiment.

FIG. 6A illustrates a process for bidirectional healing, in accordance with an embodiment. This example illustrates a process for use in implementing bidirectional healing, as previously described in connection with FIG. 3. FIG. 6A illustrates bidirectional healing, as implemented by unaffected nodes on mesh 300. Node 108 on mesh 300 receives an indication that connectivity has been fully or partially lost with node 106 (602). Node 108, once an indication has been received, informs the other nodes on mesh 300 (604). Node 108 receives messages from nodes 102 and/or 104, as applicable, indicating their availability to serve as an alternate path for traffic between nodes 106 and 108 (606). Depending upon the protocol in use (e.g., MPBGP, Targeted LTP, etc.) and the configuration, one of the nodes that advertised itself as available is selected to provide an alternate path (608). Once selected, the alternate path is signaled to the other applicable nodes of mesh 300 (610).

Figure 6B:
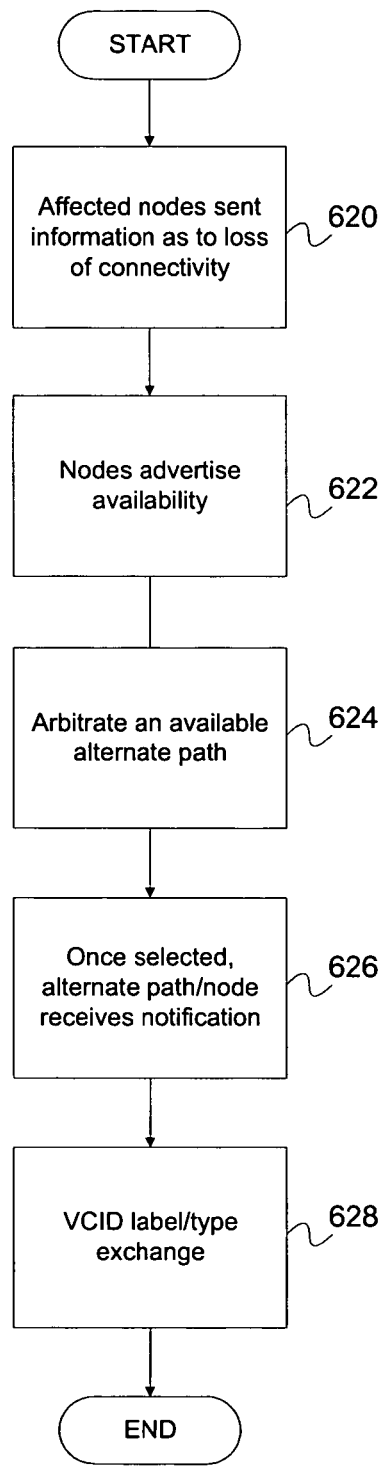
FIG. 6B illustrates a complementary process for bidirectional healing, in accordance with an embodiment.

FIG. 6B illustrates a complementary process for bidirectional healing, in accordance with an embodiment. The process shown in FIG. 6B recognizes that depending on how the nodes are configured in a particular embodiment and the circumstances of a particular failure scenario, under the bidirectional approach it may be necessary to arbitrate between competing possible alternate paths, e.g., to select between an alternate path proposed by one of the affected nodes (e.g., node 106) and a different path proposed by another (e.g., node 108). This is so because the alternate path is bidirectional, such that each affected node cannot choose independently of other affected nodes the alternate path by which it will be reached, unlike in the unidirectional approach. Again, an affected node sends information as to the loss of connectivity over a particular connection, path, pseudowire, etc. (620). Nodes that are available to act as an alternate path advertise their availability to the affected node(s) (622). However, unlike unidirectional healing, bidirectional healing relies upon a management protocol in use to arbitrate between the advertised, available, alternate paths to select one for routing data to/from mesh 300 (624). Once selected, the available node is signaled to identify its selection as well as to direct it to signal the other nodes on mesh 300 that it will act as a forwarding node to the affected node 108 (626). Signaling over a Layer 2 tunnel or path may be performed to exchange the necessary VC IDs, labels, or types to establish the alternate path to the affected node (628).

Figure 7:
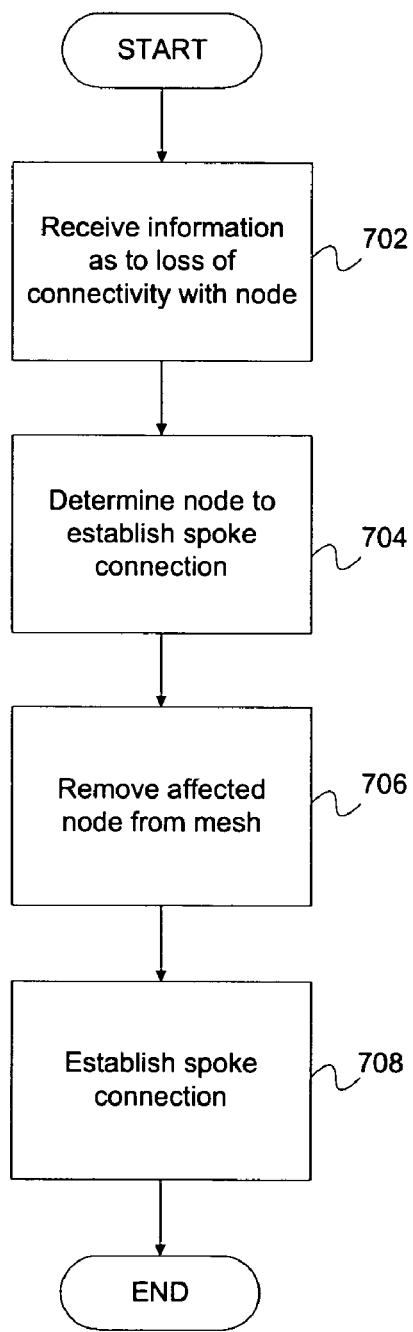
FIG. 7 illustrates a process for mesh-to-spoke healing, in accordance with an embodiment.

FIG. 7 illustrates a process for mesh-to-spoke healing, in accordance with an embodiment. In this example, a process for implementing the mesh-to-spoke configuration of FIG. 4 is shown. Nodes on mesh 400 receive an indication that a loss of connectivity has occurred with node 108 (702). Once received, affected node 108 identifies an alternate node with which it may route data to/from mesh 400 by establishing a spoke connection (704) (i.e., by converting a mesh connection to a spoke connection). The determination of an alternate path and node may be signaled using a Layer 2 tunnel or other signaling path. Once the alternate path is determined, other paths with the affected node 108 (i.e., remaining mesh connections) are removed. In the example of FIGS. 1B and 4, paths 116 and 120 are removed with node 108 (706). Path 118 is then transformed into a spoke path connection 402 (FIG. 4), establishing connectivity with node 102 (708). In one embodiment, the transformation includes using dynamic pseudowires to stitch together a path between the affected node and the mesh. In other embodiments, other dynamic uses of pseudowires or other connections may be implemented. Once the spoke connection has been established, data may be routed to/from the affected node.

In some embodiments in which unidirectional or bidirectional stitching have been employed to reestablish continuity after the loss of a mesh connection, when available the original mesh connection may be reestablished and the stitched connection terminated. In the case of a mesh-to-spoke conversion (FIGS. 4 and 7, e.g.), or in a case in which a spoke connection is established in error (misprovisioning) or a node formerly properly connected via a spoke connection is being reconfigured to be part of the mesh, the required mesh connection may be established by properly provisioning the nodes of the mesh, including the node to be added, and either converting the existing spoke connection to a mesh connection and/or establishing a new mesh connection and terminating the spoke connection.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing connectivity to a virtual service, comprising:
  receiving an indication of a connectivity loss on the virtual service between a first node and a second node;
  selecting a third node to be used to provide an alternate path between the first node and the second node; and
  establishing the alternate path using a pseudowire stitched over the third node;
  wherein the first, second, and third nodes are included in a plurality of nodes comprising a full mesh provisioned to be used to provide the virtual service; each node included in the mesh has a direct mesh connection to each other node included in the mesh and each node included in the mesh is configured to implement a split horizon by which a packet received via a mesh connection to another node included in the mesh is not normally forwarded back onto the mesh; establishing the alternate path includes at least temporarily configuring the third node to forward to the second node packets received from the first node that are associated with the pseudowire stitched over the third node, even though both the first node and the second node are associated with the mesh, as provisioned, such that absent establishment of the alternate path packets received from the first node would not otherwise be sent by the third node to another mesh node such as the second node; and establishment of the alternate path restores full mesh connectivity between the nodes provisioned to comprise the mesh.

2. A method as recited in claim 1 wherein receiving an indication of a connectivity loss further includes an affected node informing an unaffected node of the connectivity loss.

3. A method as recited in claim 1 wherein receiving an indication of a connectivity loss further includes determining a type of connectivity loss.

4. A method as recited in claim 1 wherein establishing the alternate path includes constructing a unidirectional stitched path between the first node and the second node via the third node.

5. A method as recited in claim 1 wherein establishing the alternate path includes constructing a bidirectional stitched path between the first node and the second node.

6. A method as recited in claim 1 wherein selecting a third node to be used to provide an alternate path between the first node and the second node includes selecting the third node from among a plurality of nodes competing to be selected to be used to provide the alternate path.

7. A method as recited in claim 1 wherein establishing the alternate path includes exchanging an identifier between the first node and the second node.

8. A system for providing a virtual service, comprising:
one or more processors configured to:
receive an indication of a connectivity loss on the virtual service between a first node and a second node;
select a third node to be used to provide an alternate path between the first node and the second node; and
establish the alternate path using a pseudowire stitched over the third node;
wherein the first, second, and third nodes are included in a plurality of nodes comprising a full mesh provisioned to be used to provide the virtual service; each node included in the mesh has a direct mesh connection to each other node included in the mesh and each node included in the mesh is configured to implement a split horizon by which a packet received via a mesh connection to another node included in the mesh is not normally forwarded back onto the mesh; the processor is configured to establish the alternate path at least in part by at least temporarily configuring the third node to forward to the second node packets received from the first node that are associated with the pseudowire stitched over the third node, even though both of the first node and the second node are associated with the mesh, as provisioned, such as absent establishment of the alternate path packet received from the first node would not otherwise be sent by the third node to another mesh node such as the second node; and establishment of the alternate path restores full mesh connectivity between the nodes provisioned to comprise the mesh.

9. A system as recited in claim 8 further comprising an affected node configured to inform an unaffected node of the connectivity loss.

10. A system as recited in claim 8 wherein the one or more processors are further configured to determine a type of connectivity loss.

11. A system as recited in claim 8 wherein the one or more processors are configured to establish the alternate path at least in part by constructing a unidirectional stitched path between the first node and the second node via the third node.

12. A system as recited in claim 8 wherein the one or more processors are configured to establish the alternate path at least in part by constructing a bidirectional stitched path between the first node and the second node.

13. A system as recited in claim 8 wherein the one or more processors are configured to select the third node to be used to provide an alternate path between the first node and the second node at least in part by selecting the third node from among a plurality of nodes competing to be selected to be used to provide the alternate path.

14. A system as recited in claim 8 wherein the one or more processors are configured to establish the alternate path at least in part by exchanging an identifier between the first node and the second node.

15. A computer program product for providing a virtual service, the computer program product being embodied in a computer readable storage medium and comprising computer instructions for:
receiving an indication of a connectivity loss on the virtual service between a first node and a second node;
selecting a third node to be used to provide an alternate path between the first node and the second node; and
establishing the alternate path using a pseudowire stitched over the third node;
wherein the first, second, and third nodes are included in a plurality of nodes comprising a full mesh provisioned to be used to provide the virtual service; each node included in the mesh has a direct mesh connection to each other node included in the mesh and each node included in the mesh is configured to implement a split horizon by which a packet received via a mesh connection to another node included in the mesh is not normally forwarded back onto the mesh; establishing the alternate path includes at least temporarily configuring the third node to forward to the second node packets received from the first node that are associated with the pseudowire stitched over the third node, even though both the first node and the second node are associated with the mesh, as provisioned, such that absent establishment of the alternate path packets received from the first node would not otherwise be sent by the third node to another mesh node such as the second node; and establishment of the alternate path restores full mesh connectivity between the nodes provisioned to comprise the mesh.

16. A computer program product as recited in claim 15 wherein receiving an indication of a connectivity loss further includes an affected node informing an unaffected node of the connectivity loss.

17. A computer program product as recited in claim 15 wherein receiving an indication of a connectivity loss further includes determining a type of connectivity loss.

18. A computer program product as recited in claim 15 wherein establishing the alternate path includes constructing a unidirectional stitched path between the first node and the second node via the third node.

19. A computer program product as recited in claim 15 wherein establishing the alternate path includes constructing a bidirectional stitched path between the first node and the second node.

20. A computer program product as recited in claim 15 wherein selecting a third node to be used to provide an alternate path between the first node and the second node includes selecting the third node from among a plurality of nodes competing to be selected to be used to provide the alternate path.

21. A computer program product as recited in claim 15 wherein establishing the alternate path includes exchanging an identifier between the first node and the second node.

* * * * *